(12) United States Patent
Saida et al.

(10) Patent No.: US 6,724,957 B2
(45) Date of Patent: Apr. 20, 2004

(54) OPTICAL FILTER

(75) Inventors: Takashi Saida, Sagamihara (JP); Takayuki Mizuno, Yamato (JP); Akira Himeno, Mito (JP); Katsunari Okamoto, Mito (JP); Koichi Takiguchi, Mito (JP); Manabu Oguma, Yamato (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 21 days.

(21) Appl. No.: 10/213,075

(22) Filed: Aug. 7, 2002

(65) Prior Publication Data
US 2003/0031406 A1 Feb. 13, 2003

(30) Foreign Application Priority Data
Aug. 8, 2001 (JP) ......................................... 2001-241367

(51) Int. Cl.$^7$ .............................. G02B 6/26; G02B 6/293
(52) U.S. Cl. ............................. 385/27; 385/40; 385/42; 398/53; 398/82; 398/85
(58) Field of Search .............................. 398/53, 82, 83, 398/85; 385/24, 27, 39, 40, 42

(56) References Cited

U.S. PATENT DOCUMENTS

| | | | |
|---|---|---|---|
| 5,351,317 A | * 9/1994 | Weber ............................. | 385/3 |
| 5,930,414 A | * 7/1999 | Fishman et al. ............... | 385/11 |
| 6,212,315 B1 | 4/2001 | Doerr | |
| 6,351,581 B1 | * 2/2002 | Doerr et al. ................... | 385/24 |
| 6,546,158 B2 | * 4/2003 | Fondeur et al. ................ | 385/3 |

FOREIGN PATENT DOCUMENTS

WO   WO 00/70402 A1   11/2000

OTHER PUBLICATIONS

Sasayama et al., "Coherent Optical Transversal Filter Using Silica–Based Single–Mode Waveguides", Electronic Letters, IEE Stevenage, vol. 25, No. 22, pp. 1508–1509, (Oct. 26, 1989).

Jinguji et al., "Two–part Optical Wavelength Circuits Composed of Cascaded Mach–Zehnder Interferometers With Point–Symmetrical Configurations", Journal of Lightwave Technology, IEEE, vol. 14, No. 10, pp. 2301–2310, (Oct. 1996).

Oguma et al., "Flat–top and Low–Loss WDM Filter Composed of Lattice–form Interleave Filter and Arrayed–Waveguide Gratings on One Chip", Optical Fiber Communication Conference (OFC), Technical Digest Postconference Edition, vol. 1 of 4, pp. wb3–1–wb3–3, (Mar. 17–22, 2001).

M. Oguma et al., "Flat–passband interleave filter with 200 GHz channel spacing based on planar lightwave circuit–type lattice structure", Electronics Letters, vol. 36, No. 15, pp. 1299–1300.

* cited by examiner

Primary Examiner—Edward J. Glick
Assistant Examiner—Krystyna Suchecki
(74) Attorney, Agent, or Firm—Venable LLP; Michael A. Sartori

(57) ABSTRACT

It is an object of the present invention to provide an optical filter which allows parameters to be easily adjusted, which allows birefringence and temperature dependence to be easily compensated for, and which is essentially free from dispersion. The optical filter includes an optical coupler that splits light into two beams, optical couplers connected to outputs of the optical coupler, a first group of two optical waveguide delay lines connected to the coupler, a second group of two optical waveguide delay lines connected to the coupler, an optical coupler that combines lights from the first group of the lines, an optical coupler that combines lights from the second group of the lines, and a multimode interference optical coupler that combines lights from the couplers together.

11 Claims, 15 Drawing Sheets

OPTICAL FILTER

This application is based on Patent Application No. 2001-241367 filed Aug. 8, 2001 in Japan, the content of which is incorporated hereinto by reference.

BACKGROUND OF THE INVENTION

1. Field of the Invention

The present invention relates to an optical filter, and more specifically, to an optical filter that splits or combines wavelength multiplexed optical signals.

2. Description of the Related Art

An optical filter that splits or combines optical signals according to wavelengths is a key device in a wavelength multiplexing optical communication system. In particular, an interleaver that can extract or insert every other of a plurality of optical signals spaced at optical frequency intervals of $\Delta f$ can be combined with an arrayed wavelength grating or a dielectric multilayer optical filter to easily and economically provide a high-density wavelength multiplexing optical communication system.

Conventional interleavers are implemented in a lattice type configuration having a large number of Mach-Zehnder interferometers connected together. Such an interleaver is described in, for example, Oguma et al., "Flat-passband interleave filter with 200 GHz channel spacing based on planar lightwave circuit-type lattice structure", Electronics Letters, Vol. 36, No. 15, pp. 1299 to 1300.

FIG. 1 shows the configuration of a conventional interleaver. The interleaver is composed of a substrate 100 and the following components formed on the substrate 100 and connected together in the following order: input optical waveguides 101a and 101b, a first optical coupler 102, a Mach-Zehnder interferometer consisting of a pair of optical waveguide delay lines 103a and 103b having an optical path difference $2\Delta\tau$, a second optical coupler 104, a pair of optical wavelength delay lines 105a and 105b having an optical path difference $\Delta\tau$, a third optical coupler 106, and output optical waveguides 107a and 107b.

The splitting ratio of the three optical couplers constituting the interleaver is set so that the first optical coupler is 10%, the second optical coupler is 70%, and the third optical coupler is 50%. Further, the optical path difference $\Delta\tau$ is set at 10 psec so that the free spectral range (period on an optical frequency axis) of transmission characteristics is 100 GHz.

FIG. 2 shows the transmission characteristics of the interleaver. These transmission characteristics are observed at a first and second output waveguides when an optical signal is input to a first input waveguide. Both transparencies form the first input waveguide to the first and second output waveguides have stop bands where the optical signal is prohibited and pass bands where the optical signals is allowed to go through in an alternative manner. Further, when light at a frequency is allowed to go to the first waveguide (the pass band), the light is not allowed to go to the second waveguide (the stop band), and vice versa.

As shown in FIG. 3, an optical multi/demultiplexer of 50 GHz channel spacing can be implemented by combining the interleaver 110 with optical multi/demultiplexers 111 and 112 of 100 GHz channel spacing. In general, it is more difficult to produce an optical multi/demultiplexer with a narrower channel spacing. However, an optical multi/demultiplexer with a substantially narrow channel spacing can be provided by using an optical multi/demultiplexer of a relatively wide channel spacing which can be easily produced and the interleaver 110. To avoid degrading the transmission characteristics of an optical multi/demultiplexer of a narrow channel spacing, the transmission characteristics of the interleaver must be such that for a pass band, transmittance is close to 1 over a relatively wide range of optical frequencies, and for a stop band, transmittance is close to 0 over a relatively wide range of optical frequencies.

However, the conventional interleaver has the following problems: first, the conventional interleaver has only two outputs but has more than two parameters to be set. Accordingly, adjustment of the parameters is very complicated. In the example shown in FIG. 1, coupler splitting ratio must be set for three locations, and phase must be set for two locations. Thus, a total of five parameters must be set.

Second, the conventional interleaver has delay lines arranged in series, so that if half wave plates are used to compensate for birefringence in the optical waveguides, a half wave plate must be inserted into each stage. As a result, excess losses increase. Further, to compensate for the dependence of the optical waveguides on temperature, material (hereinafter referred to as "temperature compensating material") whose refractive index change with a temperature has an opposite sign to that of the optical waveguides must be inserted into each stage. As a result, excess losses increase.

Third, instead of realizing the flat characteristics of pass bands using a smaller number of stages, the conventional interleaver has non-linear phase characteristics. As a result, the pass bands have chromatic dispersion. Such chromatic dispersion may cause signal quality to be degraded when interleavers are used in a long-distance high-speed optical transmission system.

SUMMARY OF THE INVENTION

It is an object of the present invention to provide an optical filter which allows parameters to be easily adjusted, which allows birefringence and temperature dependence to be easily compensated for, and which is essentially free from dispersion.

To attain this objects, an optical filter comprises an input optical waveguide, a first optical coupler that splits an optical signal guided by the input optical waveguide into two parts, at least one optical splitting means connected to an output of the first optical coupler, two groups of optical waveguide delay lines (the minimum number of constituents of the group is 1) connected to outputs of the optical splitting means, or an output of the optical coupler and an output of the optical splitting means, at least one optical combining means for combining any lights from the two groups of optical waveguide delay lines, a second optical coupler having a symmetric power splitting ratio and connected to outputs of the optical combining means, or an output of the optical combining means and the optical waveguide delay line, and an output optical waveguide connected to an output of the second optical coupler, all of said components being formed on a substrate, and wherein delay time provided by one of the two groups of optical waveguide delay lines is set to be $\tau_0 + 2n\Delta\tau + \alpha_n$ ($\tau_0$ and $\Delta\tau$ are positive real numbers, n is an integer that varies with optical waveguide delay line, $|\alpha n| \leq \lambda/u$, $\lambda$ is a wavelength, and u is the speed of light propagating through the waveguides), and delay time provided by the other group of optical waveguide delay lines is set to be $\tau_0 + (2m+1)\Delta\tau + \beta_m$ (m is an integer that varies with optical waveguide delay line, $|\beta m| \leq \lambda/u$).

The above and other objects, effects, features and advantages of the present invention will become more apparent

DETAILED DESCRIPTION OF PREFERRED EMBODIMENTS

Embodiments of the present invention will be described below with reference to the drawings. In this embodiment, a silica-based optical waveguide will be described which has optical waveguides formed on a silicon substrate. The silica-based optical waveguide can be connected to optical fibers with low losses, thereby providing a stable and inexpensive optical filter. However, the present invention is not limited to this embodiment, but other optical waveguides may be used such as a semiconductor optical waveguide, a polymer optical waveguide, and a dielectric optical waveguide. Further, in the following description, for simplification, those optical element circuits which have the same functions are denoted by the same symbols, and duplicate description is avoided.

[First Embodiment]

Figure 1:
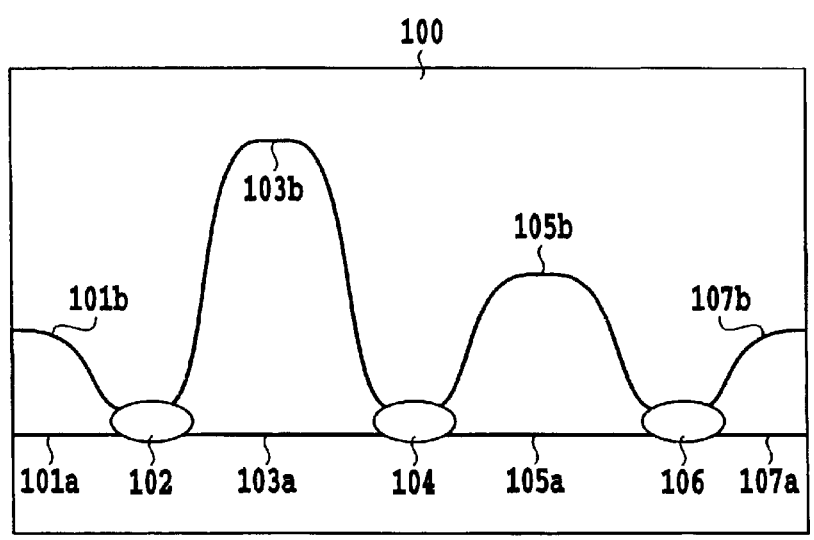
FIG. 1 is a diagram showing the configuration of a conventional interleaver.
Figure 2:
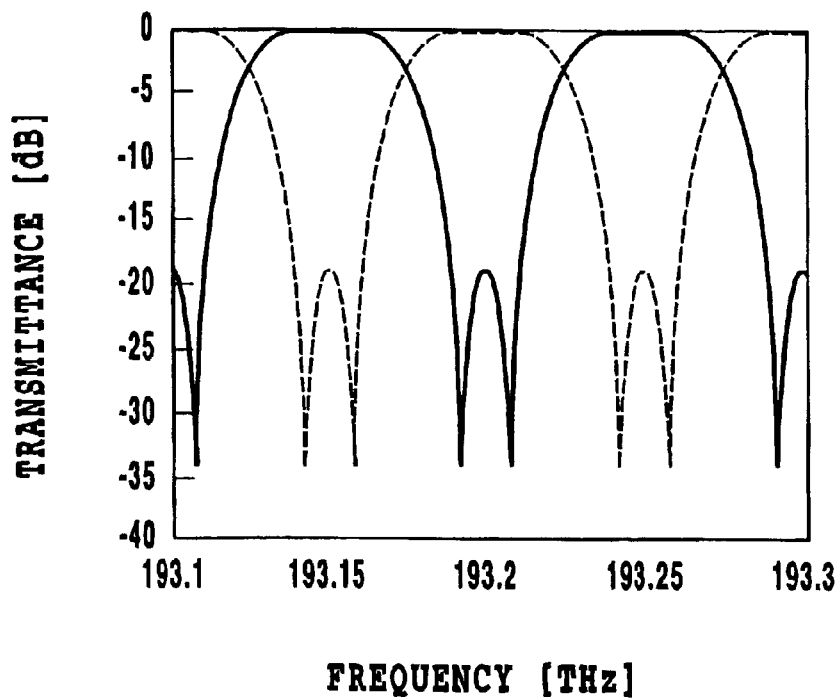
FIG. 2 is a chart showing the transmission characteristics of the conventional interleaver.
Figure 3:
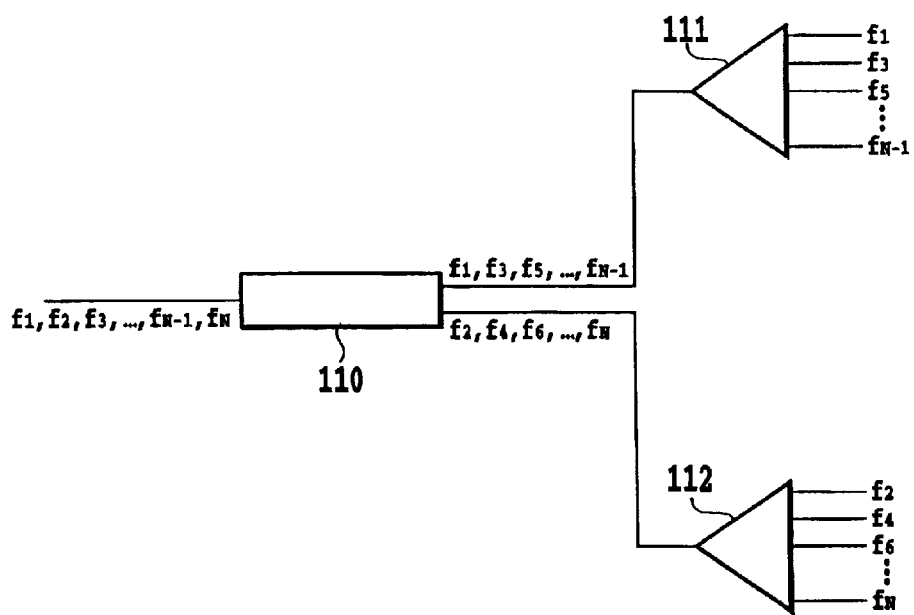
FIG. 3 is a diagram showing an example of the usage of the conventional interleaver.
Figure 4:
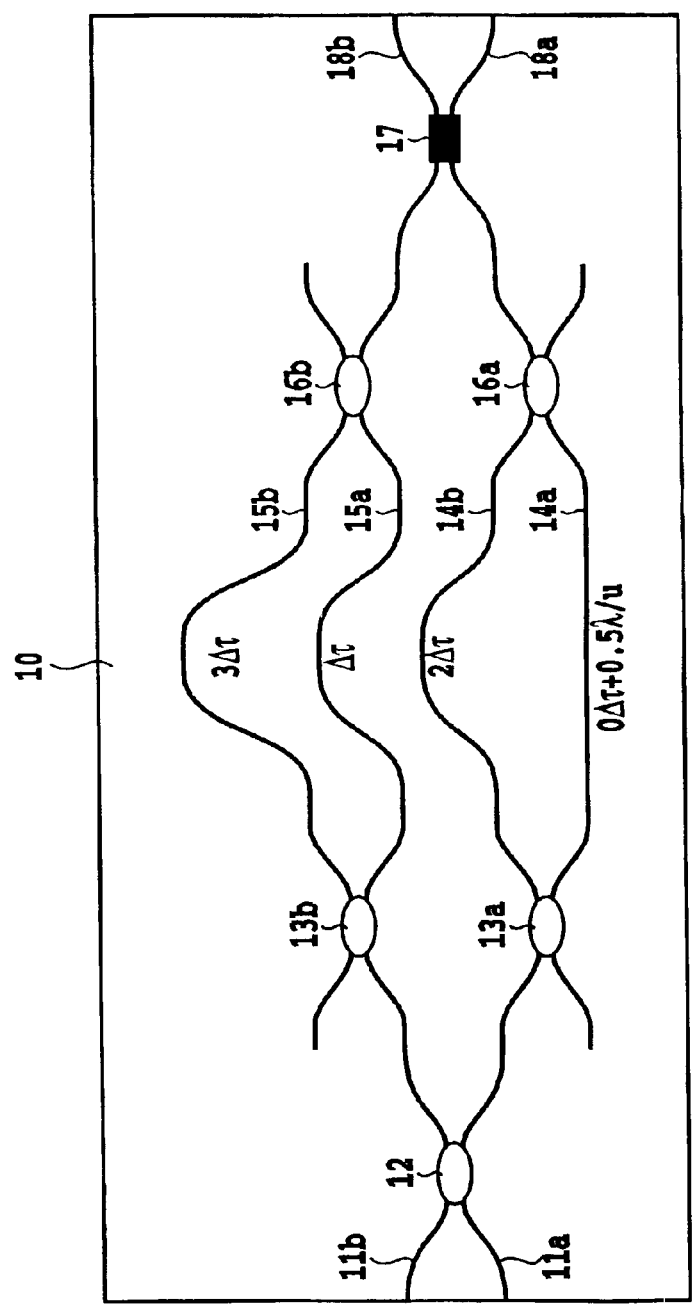
FIG. 4 is a diagram showing an optical filter according to a first embodiment of the present invention.

FIG. 4 shows an optical filter according to a first embodiment of the present invention. The optical filter has a substrate 10, input optical waveguides 11a and 11b, and a first optical coupler 12. The optical coupler 12 has 1×2 optical coupler 13a connected to one output thereof and corresponding to optical splitting means. The optical coupler 12 has 1×2 optical coupler 13b connected to the other output thereof and corresponding to optical splitting means.

The optical filter has two groups of optical waveguide delay lines consisting of a first group of optical waveguide delay lines 14a and 14b connected to an output of the 1×2 optical coupler 13a and a second group of optical waveguide delay lines 15a and 15b connected to an output of the 1×2 optical coupler 13b. In a first embodiment, each of the two groups of optical waveguide delay lines is composed of two optical waveguides. The two optical waveguides are provided because an effective interleaver can be easily constructed. However, the present invention is not limited to this example, but a combination of another number of optical waveguides may be used.

The first group of optical waveguide delay lines 14a and 14b have a 2×1 optical coupler 16a connected to an output thereof and corresponding to optical combining means. The second group of optical waveguide delay lines 15a and 15b have a 2×1 optical coupler 16b connected to an output thereof and corresponding to optical combining means. Furthermore, the optical filter has a multimode interference coupler 17 having a splitting ratio of 0.5 and which combines light from the 2×1 optical coupler 16a with light from the 2×1 optical coupler 16b, the multimode interference coupler 17 corresponding to a second optical coupler, and output optical waveguides 18a and 18b that guide outputs from the multimode interference coupler.

In this case, absolute delay time provided by the optical waveguide delay line 14a is defined as $\tau_0$. Relative delay time provided by the optical waveguide delay line 14a is defined as $0\Delta\tau + 0.5\lambda/u$. Reference character $\lambda$ denotes a center wavelength of light for use in the optical filter. Reference character u denotes the speed of light propagating through the optical waveguides. In this case, a delay time difference provided by the optical waveguide delay line 14b is $2\Delta\tau$. Delay time provided by the optical waveguide delay line 15a is $\Delta\tau$. Delay time provided by the optical waveguide delay line 15b is $3\Delta\tau$.

In this case, the absolute delay time provided by the optical waveguide delay line 14 is generalized as $\tau_0 + 2n\Delta\tau + \alpha_n$. For $\alpha_n$, $|\alpha_n| \leq \lambda/u$. Reference character $\lambda$ denotes a center wavelength of light for use in the optical filter. Reference character u denotes the speed of light propagating through the optical waveguides. Similarly, absolute delay time provided by the optical waveguide delay line 15 is $\tau_0 + (2m+1)\Delta\tau + \beta_m$. For $\beta_m$, $|\beta_m| \leq \lambda/u$.

The optical coupler 12 has a splitting ratio of 0.7. The optical couplers 13a and 16a have splitting ratios of 0.7. The optical couplers 13b and 16b have splitting ratios of 0.16. These splitting ratios are only an example of coefficients used to implement an interleaver, and another combination of splitting ratios may be used. Further, the optical couplers 13a and 16a have an equal splitting ratio, and the optical couplers 13b and 16b have an equal splitting ratio. This is because this configuration minimizes losses to the optical filter. However, the present invention is not limited to this example. The optical couplers 13a and 16a may have different splitting ratios, and the optical couplers 13b and 16b may have different splitting ratios.

In the optical filter of the first embodiment, the optical coupler 17 is composed of a multimode interference coupler because it is excellent in reproducibility. However, the present invention is not limited to this example. Of course, another coupler such as a directional coupler may be used.

Further, the optical filter of the first embodiment is characterized in that circuit parameters can be easily extracted and set because the optical waveguide delay lines provide different amounts of delay and because the circuit parameters can thus be easily estimated using a method such as Fourier transform spectroscopy.

Figure 5:
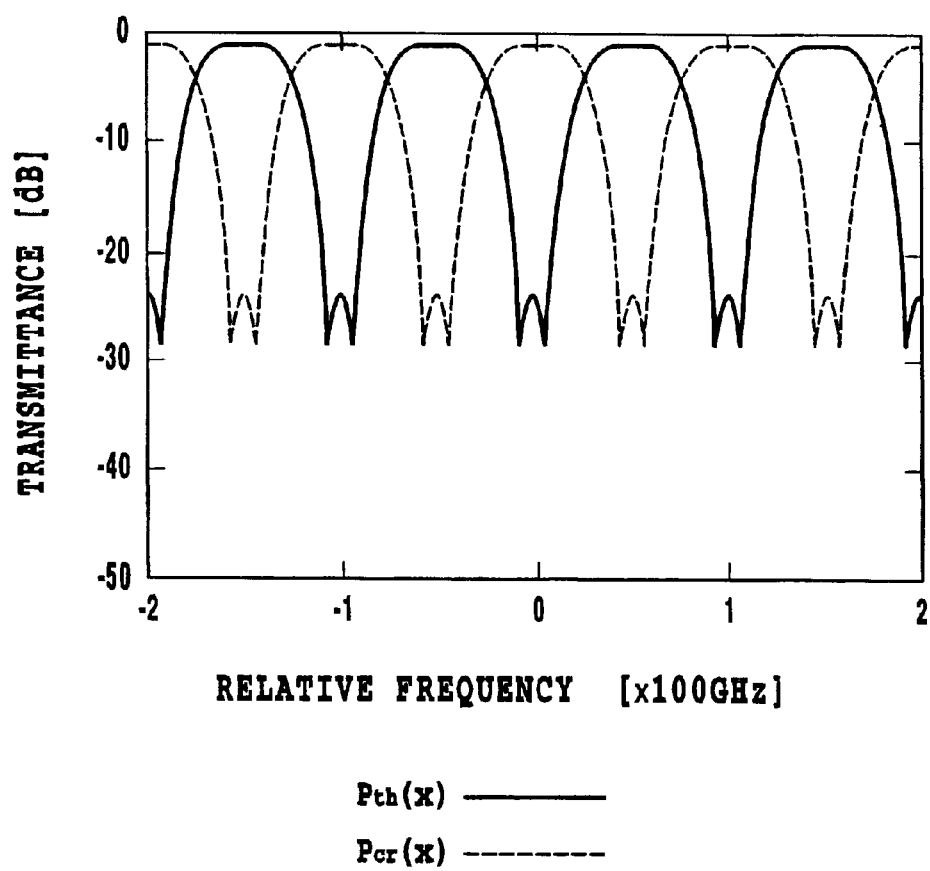
FIG. 5 is a chart showing the transmission characteristics of the optical filter of the first embodiment.

FIG. 5 shows the transmission characteristics of the optical filter according to the first embodiment shown in FIG. 4. This figure shows the optical frequency transmission characteristics for transmission of light from the input optical waveguide 11a to the output waveguides 18a and 18b. Both light output to the output waveguide 18a and light output to the output waveguide 18b alternately have pass bands where optical signals pass and stop bands where no optical signals pass. The optical frequency transmission characteristics of light output to the output waveguide 18a and of light output to the output waveguide 18b are such that when one of the characteristics has a pass band, the other has a stop band.

[Second Embodiment]

Figure 6:
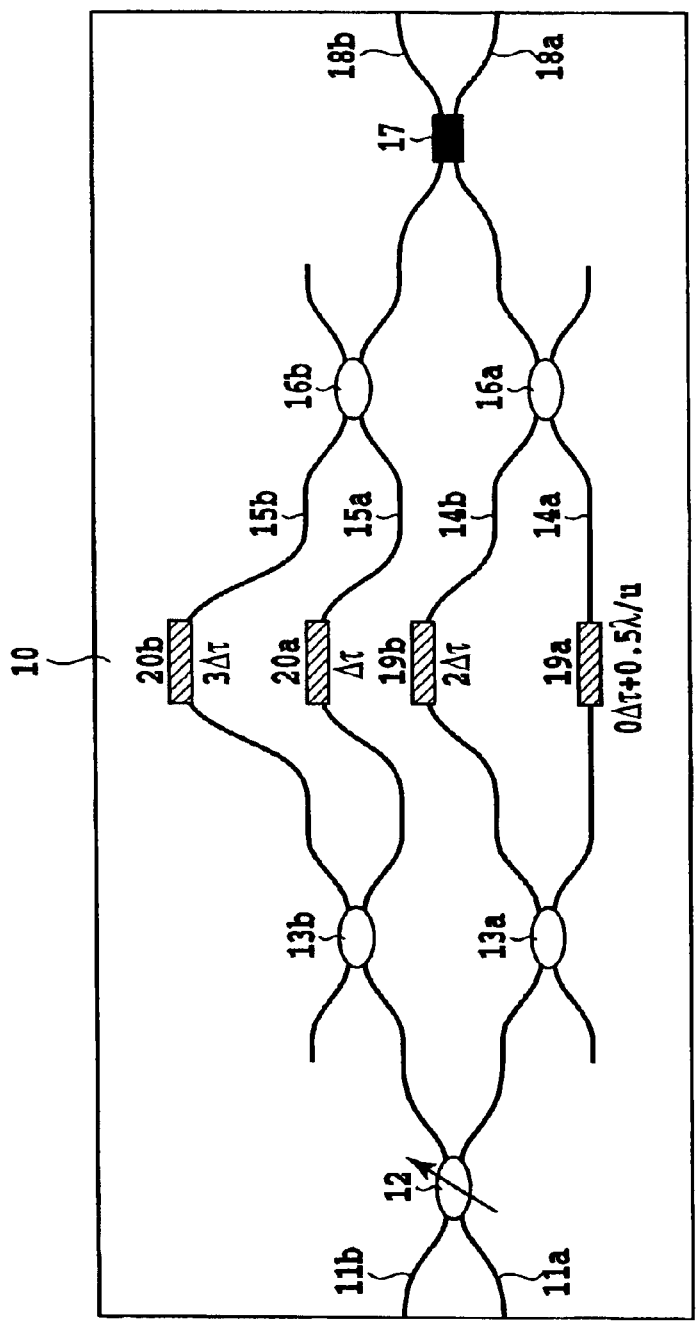
FIG. 6 is a diagram showing the configuration of an optical filter according to a second embodiment of the present invention.

FIG. 6 shows a second embodiment as a variation of the first embodiment, shown in FIG. 4. The second embodiment includes not only the configuration of the optical filter according to the first embodiment but also an optical coupler with a tunable coupling ratio as the first optical coupler 12. Further, thin film heaters 19a and 19b are provided on the optical waveguide delay lines 14a and 14b, respectively, to adjust phase. Thin film heaters 20a and 20b are provided on the optical waveguide delay lines 15a and 15b, respectively, to adjust phase.

Since the optical coupler with the tunable coupling ratio is used as the optical coupler 12, any characteristic of the optical filter which has deviated from the corresponding set value owing to a manufacture error or the like, particularly a reduced extinction ratio for stop bands can be compensated for.

Figure 7:
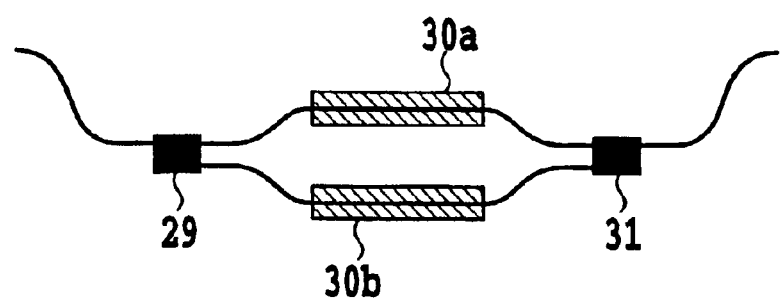
FIG. 7 is a diagram showing the configuration of an optical coupler with a tunable coupling ratio.

The optical coupler with the tunable coupling ratio may be composed of the Mach-Zehnder interferometer shown in FIG. 7. The Mach-Zehnder interferometer is composed of an optical coupler 29, optical waveguides 30a and 30b provided with heaters as phase adjusters, and an optical coupler 31. The Mach-Zehnder interferometer is only an example of implementation of the optical coupler with the tunable coupling ratio. The optical coupler with the tunable coupling ratio may be implemented using another means such as light irradiation or annealing.

Further, the phase adjusters shown in FIG. 7 make adjustments on the basis of thermooptic effects using the heaters. However, the present invention is not limited to this example. For example, the phase adjusters may be implemented using another means such as electro-optic effects.

According to the second embodiment, the optical filter is provided with the thin film heaters 19a and 19b on the optical waveguide delay lines 14a and 14b, respectively, to adjust phase and the thin film heaters 20a and 20b on the optical waveguide delay lines 15a and 15b, respectively, to adjust phase. With this configuration, even if the lengths of the optical waveguide delay lines 14a, 14b and 15a, 15b deviate from the predetermined values due to manufacture errors or the like, degradation of the characteristics of the optical filter can be compensated for.

In the second embodiment, shown in FIG. 6, the thin film heaters are used as stable and reliable phase adjusting means. However, the present invention is not limited to this example. Phase adjustment may be carried out using another means such as application of light or heat.

[Third Embodiment]

Figure 8:
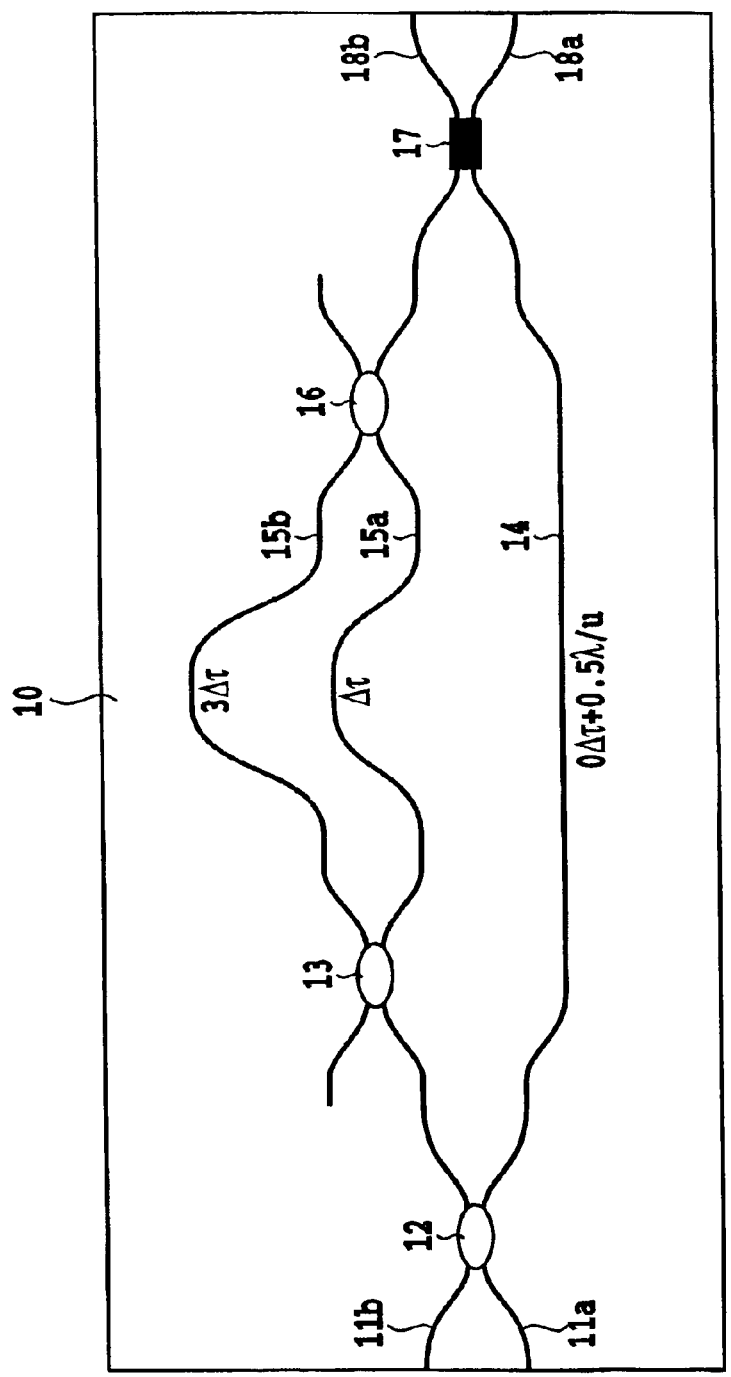
FIG. 8 is a diagram showing the configuration of an optical filter according to a third embodiment of the present invention.

FIG. 8 shows an optical filter according to a third embodiment of the present invention. This optical filter has the substrate 10, the input optical waveguides 11a and 11b, and the first optical coupler 12 that splits light from the input optical waveguides 11a and 11b into two beams. The optical coupler 12 has a 1×2 optical coupler 13 connected to one output thereof and corresponding to optical splitting means.

The optical filter has two groups of optical waveguide delay lines consisting of a first group 14 of optical waveguide delay lines connected to the other output of the optical coupler 12 and a second group of optical waveguide delay lines 15a and 15b connected to an output of the 1×2 optical coupler 13. In the third embodiment, the first group includes one optical waveguide, and the second group includes two optical waveguides. Thus, the optical waveguide delay line may be composed of only one optical waveguide. However, the present invention is not limited to this example. A combination of other numbers of optical waveguides may be used.

The second group of optical waveguide delay lines 15a and 15b have a 2×1 optical coupler 16 connected to an output thereof and corresponding to optical combining means. Furthermore, the optical filter has the second optical coupler 17 having a splitting ratio of 0.5 and which combines light from the 2×1 optical coupler 16 with light from the first group 14 of optical waveguide delay lines, and the output optical waveguides 18a and 18b that guide outputs from the optical coupler 17.

In this case, if relative delay time provided by the optical waveguide delay line 14 is defined as $0\Delta\tau+0.5\lambda/u$, then a delay time difference provided by the optical waveguide delay line 15a is $\Delta\tau$. Further, delay time provided by the optical waveguide delay line 15b is $3\Delta\tau$. Reference character $\lambda$ denotes a center wavelength of light for use in the optical filter.

The optical coupler 12 has a splitting ratio of 0.58. The optical couplers 13 and 16 have splitting ratios of 0.11. These splitting ratios are only an example of coefficients used to implement an interleaver, and another combination of splitting ratios may be used. Further, the optical couplers 13 and 16 have an equal splitting ratio. This is because this configuration minimizes losses to the optical filter. However, the present invention is not limited to this example. The optical couplers 13 and 16 may have different splitting ratios.

In the optical filter of the third embodiment, the optical coupler 17 is composed of a multimode interference coupler because it is excellent in reproducibility. However, the present invention is not limited to this example. Of course, another coupler such as a directional coupler may be used.

Further, the optical filter of the third embodiment is characterized in that circuit parameters can be easily extracted and set because the optical waveguide delay lines provide different amounts of delay and because the circuit parameters can thus be easily estimated using a method such as Fourier transform spectroscopy.

Figure 9:
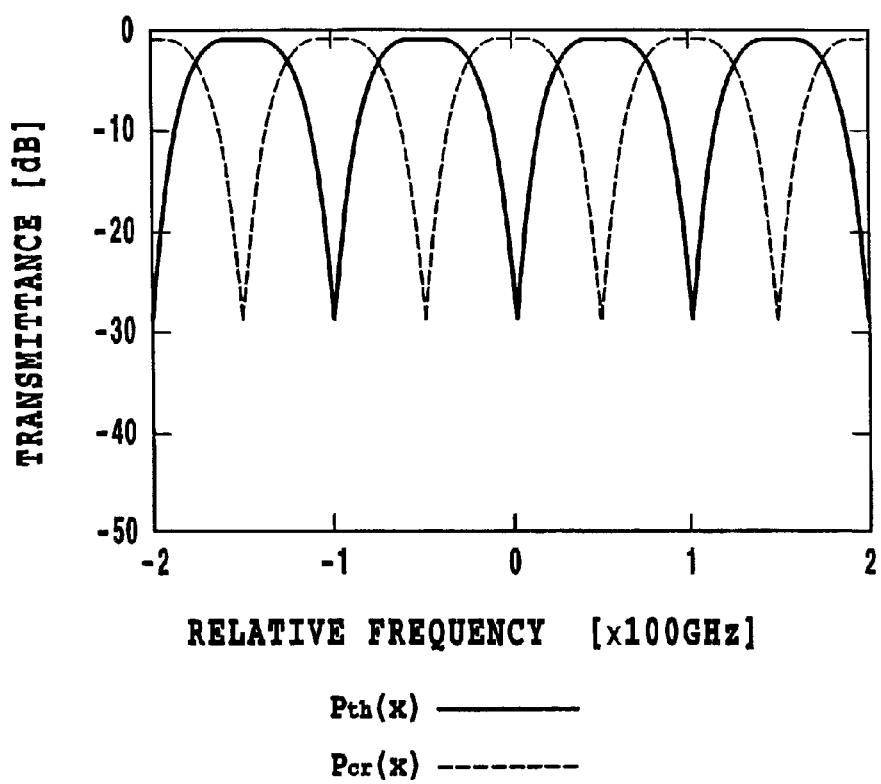
FIG. 9 is a chart showing the transmission characteristics of the optical filter of the third embodiment.

FIG. 9 shows the transmission characteristics of the optical filter according to the third embodiment shown in FIG. 8. This figure shows the optical frequency transmission characteristics for transmission of light from the input optical waveguide 11a to the output waveguides 18a and 18b. Both light output to the output waveguide 18a and light output to the output waveguide 18b alternately have pass bands where optical signals pass and stop bands where no optical signals pass. The optical frequency transmission characteristics of light output to the output waveguide 18a and of light output to the output waveguide 18b are such that when one of the characteristics has a pass band, the other has a stop band.

In the optical filter of the third embodiment, an optical coupler with a tunable coupling ratio can be used as the optical coupler 12 as in the case of FIG. 6 to compensate for the deviation of the splitting ratio of the optical couplers due to a manufacture error or the like. Further, in the optical filter of the third embodiment, if the optical waveguide delay lines 15a and 15b are provided with phase adjustment means, the deviation of lengths of the optical wavelength delay lines 14, 15a, and 15b caused by a manufacture error or the like can be compensated for.

[Fourth Embodiment]

Figure 10:
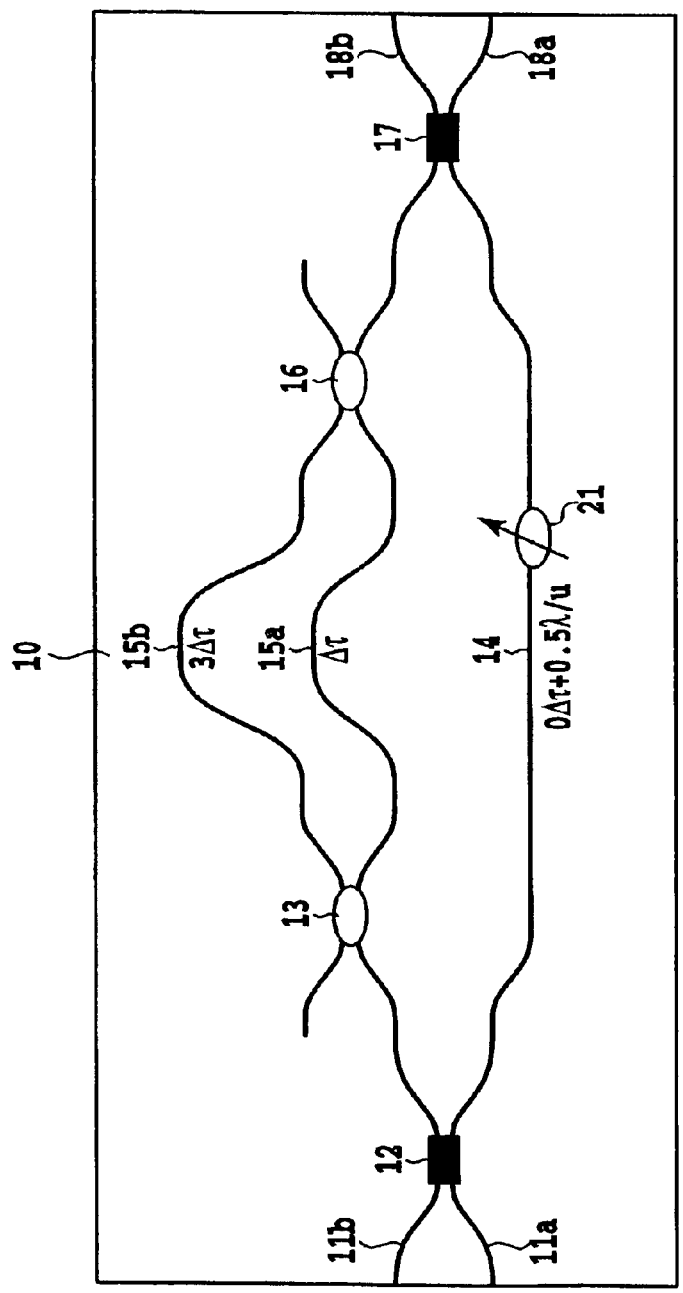
FIG. 10 is a diagram showing the configuration of an optical filter according to a fourth embodiment of the present invention.

FIG. 10 shows a fourth embodiment as a variation of the third embodiment shown in FIG. 8. The fourth embodiment includes the configuration of the optical filter according to the third embodiment. However, the first optical coupler has a splitting ratio of 0.5, and the optical waveguide delay line 14 is provided with an optical amplitude adjuster 21. Thus, the quantity of light guided to the optical waveguide delay line 15 is adjusted to reproducibly obtain the desired characteristics of the optical filter.

The optical amplitude adjuster 21 may be composed of the Mach-Zehnder interferometer shown in FIG. 7. The Mach-Zehnder interferometer is composed of the optical coupler 29, the optical waveguides 30a and 30b provided with the heaters as phase adjusters, and the optical coupler 31. The Mach-Zehnder interferometer is only an example of implementation of the optical amplitude adjuster. The optical amplitude adjuster may be implemented using another means.

The phase adjusters shown in FIG. 7 make adjustments on the basis of thermooptic effects using the heaters. However, the present invention is not limited to this example. For example, the phase adjusters may be implemented using another means such as electro-optic effects.

[Fifth Embodiment]

Figure 11:
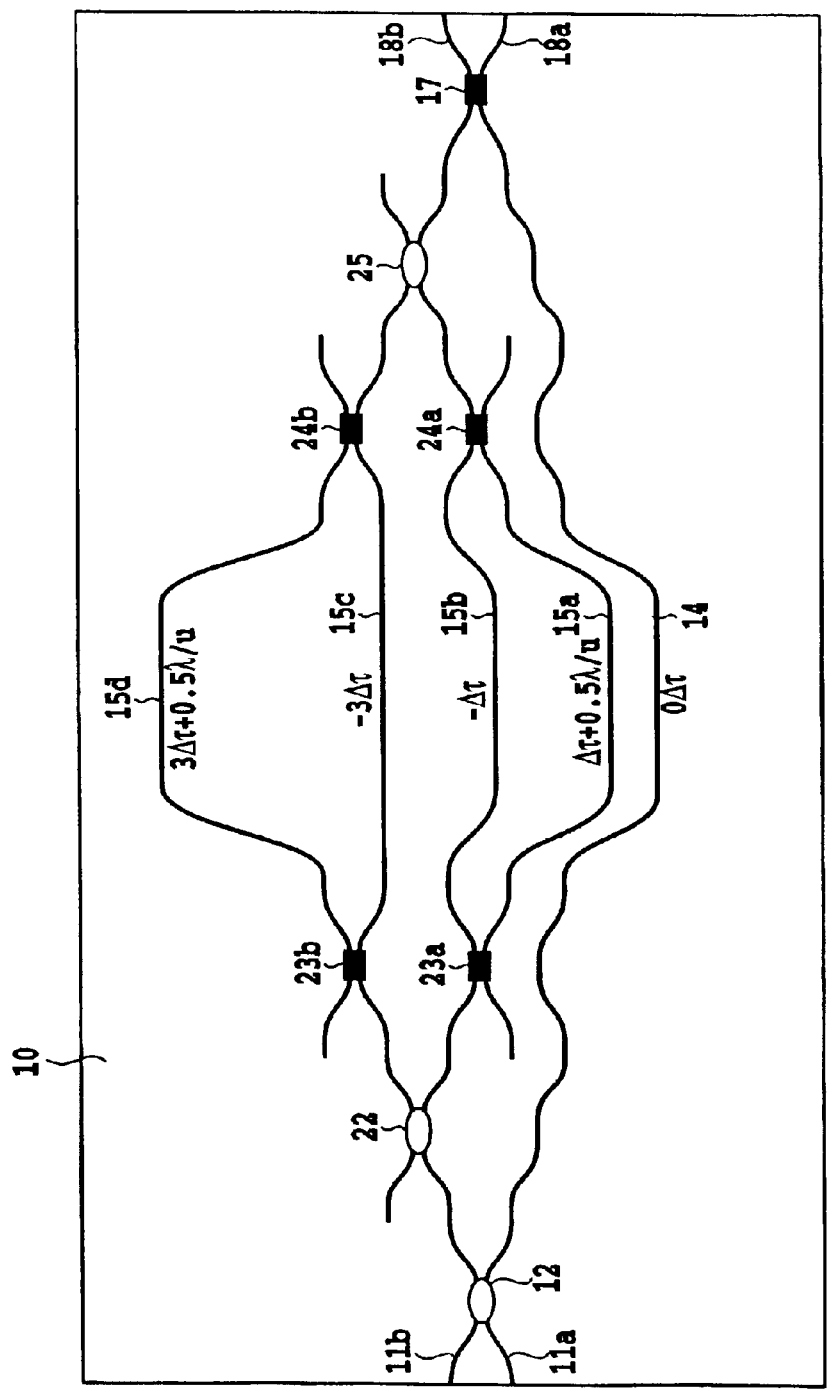
FIG. 11 is a diagram showing the configuration of an optical filter according to a fifth embodiment of the present invention.

FIG. 11 shows an optical filter according to a fifth embodiment of the present invention. This optical filter has the substrate 10, the input optical waveguides 11a and 11b, and the first optical coupler 12 that splits light from the input optical waveguides 11a and 11b into two beams. The optical coupler 12 has a 1×2 optical coupler 22 connected to one output thereof and corresponding to optical splitting means.

The optical filter has two groups of optical waveguide delay lines consisting of the first group 14 of optical waveguide delay lines connected to the other output of the optical coupler 12, multimode interference couplers 23a and 23b connected to an output of the 1×2 output coupler 22 and having a splitting ratio of 0.5, and a second group of optical waveguide delay lines 15a to 15d connected to outputs of the multimode interference couplers 23a and 23b. In the fifth embodiment, the first group includes one optical waveguide, and the second group includes four optical waveguides. This is because this configuration allows an effective interleaver to be easily constructed. However, the present invention is not limited to this example. A combination of other numbers of optical waveguides may be used.

The second group of optical waveguide delay lines 15a to 15d have multimode interference couplers 24a and 24b connected to outputs thereof and corresponding to optical combining means. A 2×1 optical coupler 25 couples outputs from the multimode interference couplers 24a and 24b together. Furthermore, the optical filter has the second optical coupler 17 having a splitting ratio of 0.5 and which combines light from the 2×1 optical coupler 25 with light from the first group 14 of optical waveguide delay lines, and the output optical waveguides 18a and 18b that guide outputs from the optical coupler 17.

In this case, if relative delay time provided by the optical waveguide delay line 14 is defined as $0\Delta\tau$, then delay time difference provided by the optical waveguide delay line 15a is $\Delta\tau+0.5\lambda/u$. Further, delay time provided by the optical waveguide delay line 15b is $-\Delta\tau$. Delay time provided by the optical waveguide delay line 15c is $-3\Delta\tau$. Delay time provided by the optical waveguide delay line 15d is $3\Delta\tau+0.5\lambda/u$. Reference character $\lambda$ denotes a center wavelength of light for use in the optical filter.

The optical coupler 12 has a splitting ratio of 0.39. The optical couplers 22 and 25 have splitting ratios of 0.1. These splitting ratios are only an example of coefficients used to implement an interleaver, and another combination of splitting ratios may be used. Further, the optical couplers 22 and 25 have an equal splitting ratio. This is because this configuration minimizes losses to the optical filter. However, the present invention is not limited to this example. The optical couplers 22 and 25 may have different splitting ratios.

In the optical filter of the fifth embodiment, the optical couplers 23a, 23b, 24a, 24b, and 17 are composed of multimode interference couplers because they are excellent in reproducibility. However, the present invention is not limited to this example. Of course, other couplers such as directional couplers may be used.

Further, the optical filter of the fifth embodiment is constructed so that equal light intensity is guided to the optical waveguides 15a and 15b, which have a relative delay time of about $\pm\Delta\tau$, and to the optical waveguides 15c and 15d, which have a relative delay time of about $-3\Delta\tau$. This optical filter is characterized that dispersion in the filter can in principle be zeroed by adjusting the phase relationships of the optical waveguides.

Figure 12:
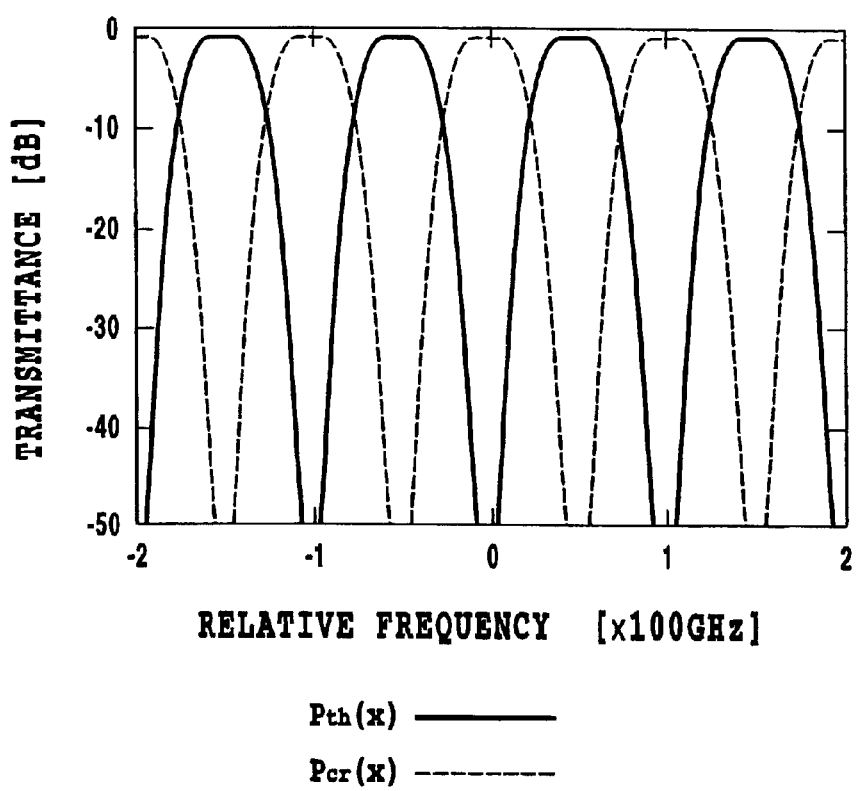
FIG. 12 is a chart showing the transmission characteristics of the optical filter of the fifth embodiment.

FIG. 12 shows the transmission characteristics of the optical filter according to the fifth embodiment shown in FIG. 11. This figure shows the optical frequency transmission characteristics for transmission of light from the input optical waveguide 11a to the output waveguides 18a and 18b. Both light output to the output waveguide 18a and light output to the output waveguide 18b alternately have pass bands where optical signals pass and stop bands where no optical signals pass. The optical frequency transmission characteristics of light output to the output waveguide 18a and of light output to the output waveguide 18b are such that when one of the characteristics has a pass band, the other has a stop band.

[Sixth Embodiment]

Figure 13:
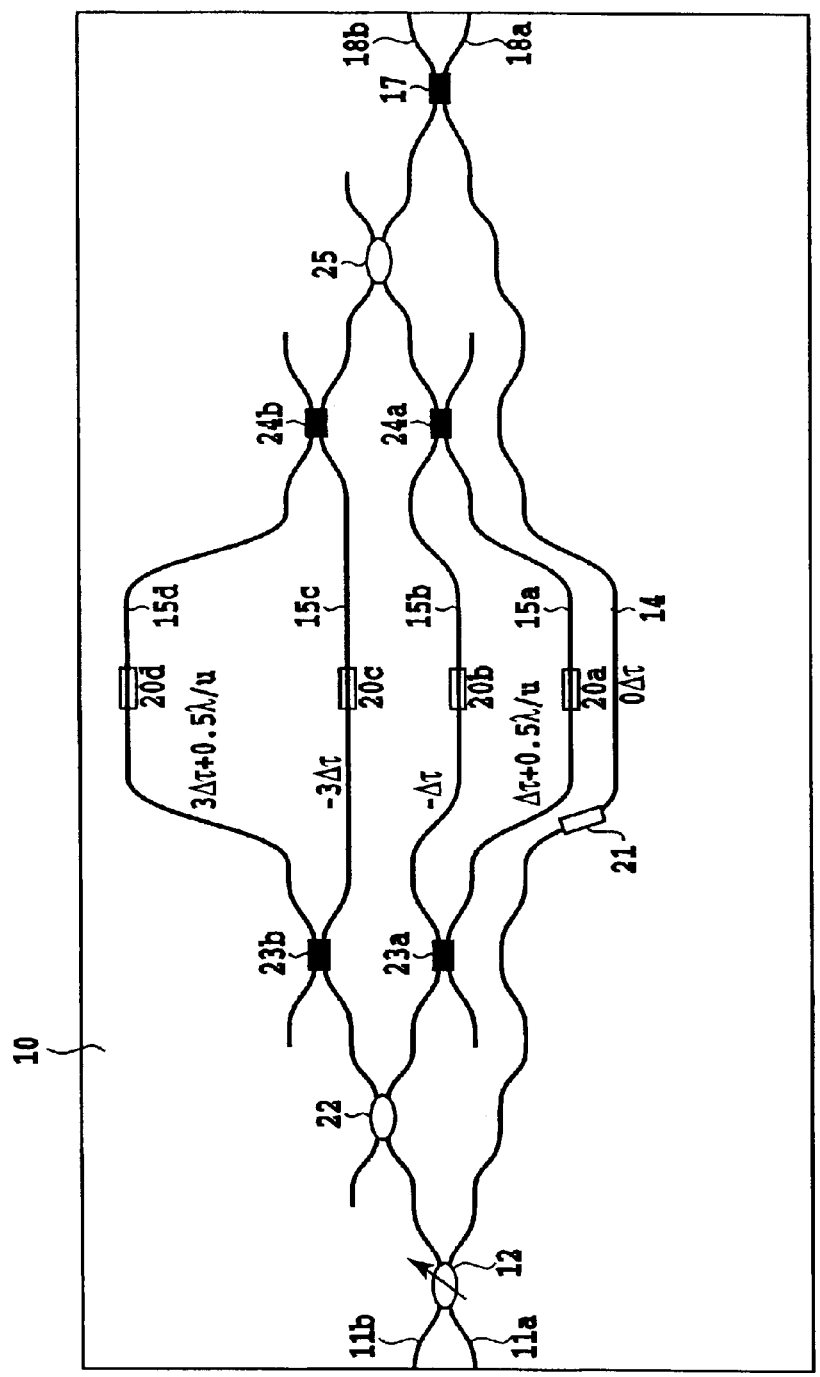
FIG. 13 is a diagram showing the configuration of an optical filter according to a sixth embodiment of the present invention.

FIG. 13 shows a sixth embodiment as a first variation of the fifth embodiment, shown in FIG. 11. The second embodiment includes not only the configuration of the optical filter according to the fifth embodiment but also an optical coupler with a tunable coupling ratio as the first optical coupler 12. With this configuration, in spite of a manufacture error or the like, the optical coupler 12 can be adjusted to obtain the desired characteristics of the optical filter.

In the sixth embodiment, thin film heaters 20a to 20d are provided on the optical waveguide delay lines 14, 15a, and 15d, respectively, to adjust phase. With this configuration, even if the lengths of the optical waveguide delay lines 14, 15a, and 15b deviate from the corresponding set values due to manufacture errors or the like, degradation of the characteristics of the optical filter can be compensated for.

Further, the optical waveguide delay line 14 is provided with the optical amplitude adjuster 21. The optical amplitude adjuster 21 may be composed of the Mach-Zehnder interferometer shown in FIG. 7. The Mach-Zehnder interferometer is composed of the optical coupler 29, the optical waveguides 30a and 30b provided with the heaters as phase adjusters, and the optical coupler 31. The Mach-Zehnder interferometer is only an example of implementation of the optical amplitude adjuster. The optical amplitude adjuster may be implemented using another means.

The phase adjusters shown in FIG. 7 make adjustments on the basis of thermooptic effects using the heaters. However, the present invention is not limited to this example. For example, the phase adjusters may be implemented using another means such as electro-optic effects.

[Seventh Embodiment]

Figure 14:
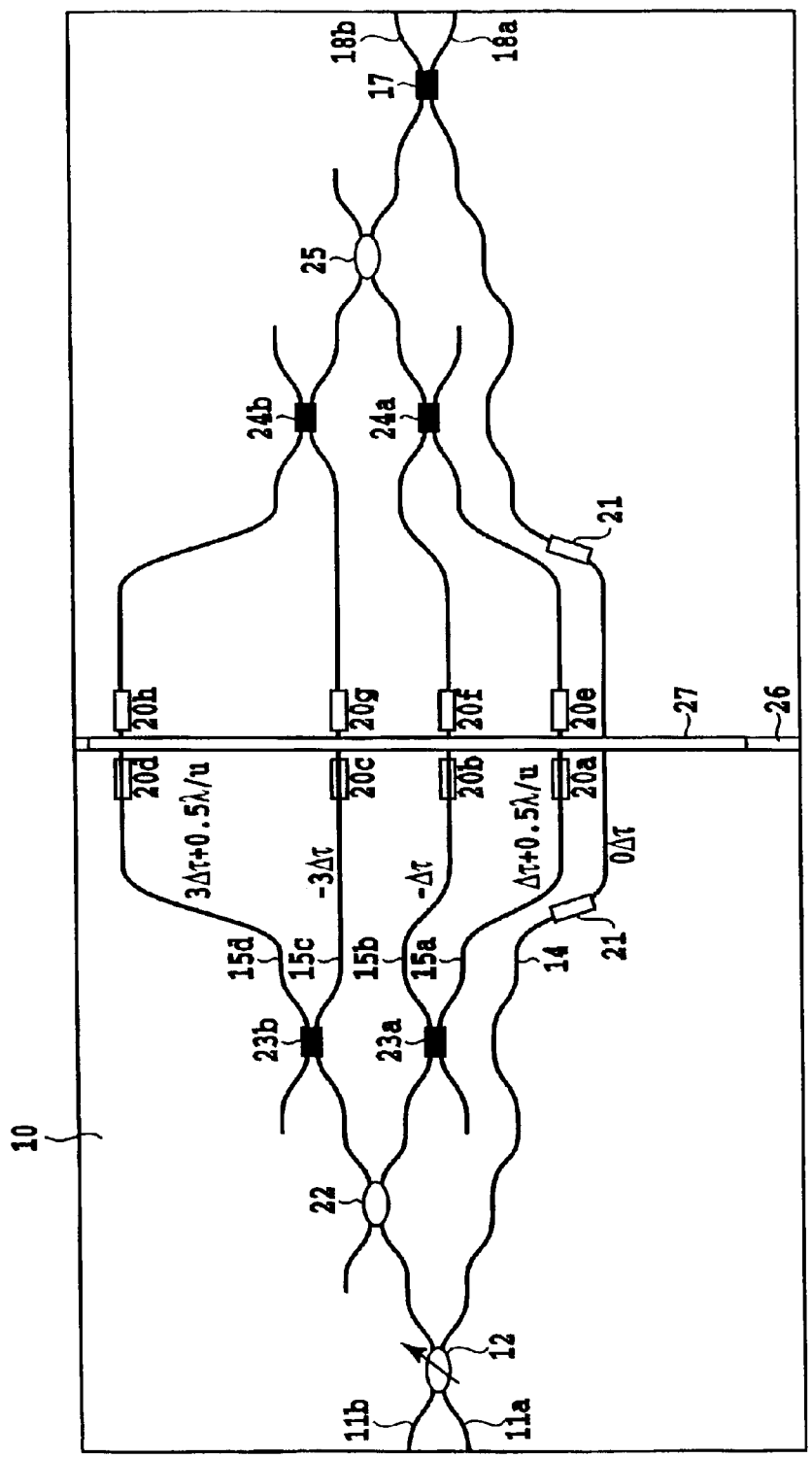
FIG. 14 is a diagram showing the configuration of an optical filter according to a seventh embodiment of the present invention.

FIG. 14 shows a seventh embodiment as a second variation of the fifth embodiment, shown in FIG. 12. The seventh embodiment includes the configuration of the optical filter according to the sixth embodiment, shown in FIG. 13. However, the optical filter is generally laterally symmetric with a groove 26 formed at a symmetry axis and crossing the optical waveguides. The groove 26 has a half wave plate 27 inserted thereinto and having a birefringence axis tilted through 45° from the birefringence axes of the optical waveguides.

With this configuration, the effects of birefringence of the optical waveguides are offset to eliminate the dependence of the optical filter on polarization such as a variation in transmittance depending on polarization. The half wave plate may be composed of polyimide, silica, or other material.

[Eighth Embodiment]

Figure 15:
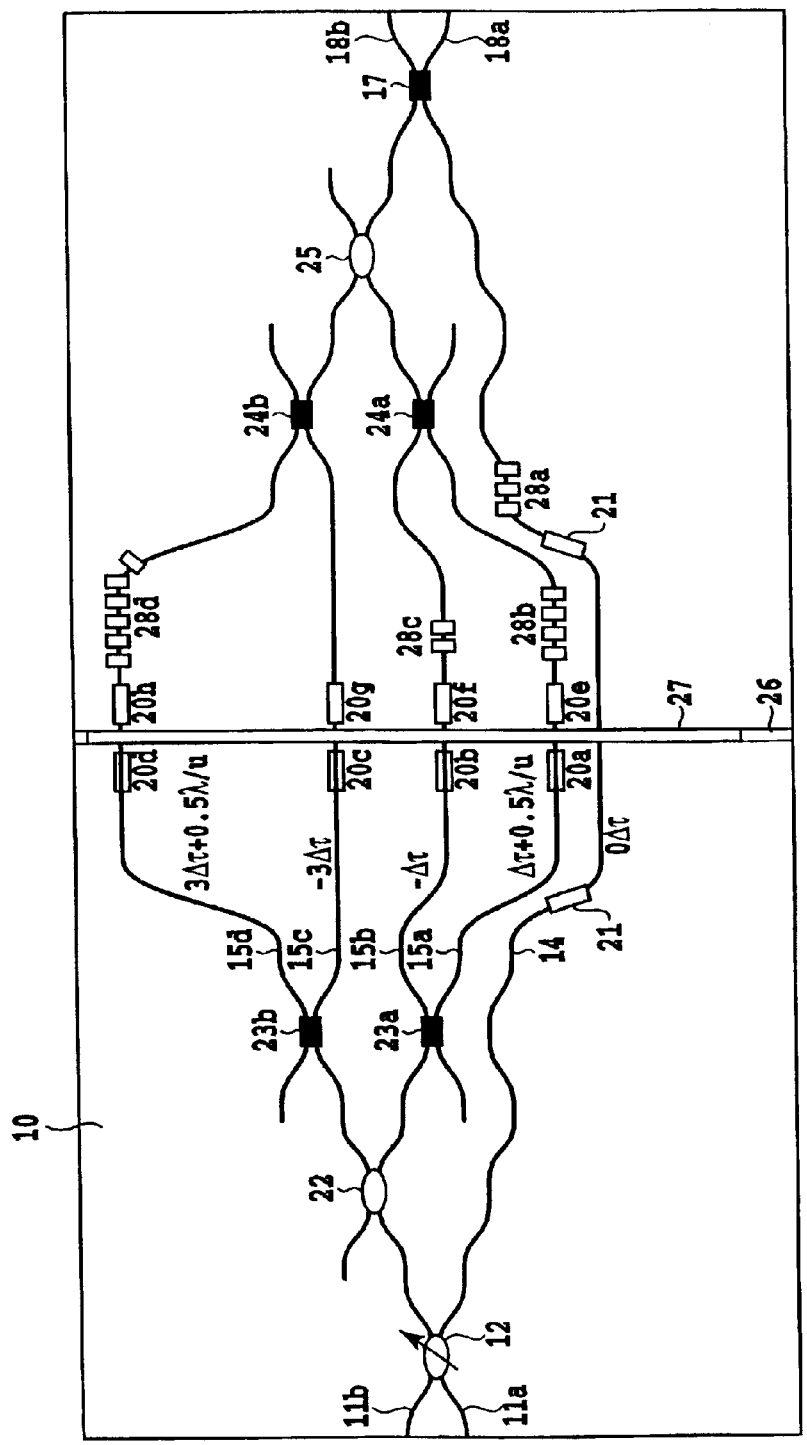
FIG. 15 is a diagram showing the configuration of an optical filter according to an eighth embodiment of the present invention.

FIG. 15 shows an eighth embodiment as a third variation of the fifth embodiment, shown in FIG. 11. The eighth embodiment includes the configuration of the optical filter according to the seventh embodiment, shown in FIG. 14. However, the optical waveguide delay lines 14, 15a, 15b, and 15d each have a plurality of grooves formed therein and crossing the corresponding waveguide. These grooves are filled with materials 28a to 28d the dependence of the refractive index of which has a sign different from that of the optical waveguides.

With this configuration, even if the refractive index of the optical waveguides varies with temperature, the effects of the variation are canceled. Therefore, an optical filter is obtained which is generally independent of temperature.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical filter comprising:

an input optical waveguide;

a first optical coupler that splits an optical signal guided by said input optical waveguide into two parts;

at least one optical splitting means connected to an output of said first optical coupler;

two groups of optical waveguide delay lines (the minimum number of constituents of the group is 1) connected to outputs of said optical splitting means, or an output of said first optical coupler and an output of said optical splitting means;

at least one optical combining means for combining any optical signals from said two groups of optical waveguide delay lines;

a second optical coupler having a symmetric power splitting ratio and connected to outputs of said optical combining means, or an output of said optical combining means and one of said two groups of optical waveguide delay lines; and an output optical waveguide connected to an output of said second optical coupler, all of said components being formed on a substrate, and wherein delay time provided by one of said two groups of optical waveguide delay lines is set to be $\tau_0 + 2n\Delta\tau + \alpha_n$ ($\tau_0$ and $\Delta\tau$ are positive real numbers, n is an integer that varies with respect to each optical waveguide delay line, $|\alpha_n| \leq \lambda/u$, $\lambda$ is a wavelength, and u is the speed of light propagating through the waveguides), and delay time provided by the other group of optical waveguide delay lines is set to be $\tau_0 + (2m+1)\Delta\tau + \beta_m$ (m is an integer that varies with optical waveguide delay line, $|\beta m| \leq \lambda/u$).

2. An optical filter according to claim 1, wherein the splitting ratio of said optical splitting means and said optical combining means are set to be substantially equal.

3. An optical filter according to claim 1, wherein said first optical coupler has a tunable coupling ratio.

4. An optical filter according to claim 1, wherein at least one optical amplitude adjusting means is provided between said first optical coupler and said second optical coupler.

5. An optical filter according to claim 1, wherein said two groups of optical waveguide delay lines are set so that equal light intensity is guided to optical waveguides providing delay time $\tau_0 \pm k\Delta\tau$ (k is a real number).

6. An optical filter according to claim 1, wherein said optical waveguide delay line comprises phase adjusting means.

7. An optical filter according to claim 1, wherein said optical waveguide delay line has a half wave plate inserted at a substantially intermediate point thereof.

8. An optical filter according to claim 1, wherein said optical waveguide delay line has one or more grooves formed therein and into which material is inserted, the material having a refractive index thermal coefficient having a sign different from the thermal coefficient of the effective refractive index of the optical waveguides.

9. An optical filter according to claim 1, wherein said optical coupler having the symmetric power splitting ratio is a multimode interference coupler.

10. An optical filter according to claim 4, wherein said optical waveguide is based on silica, and said optical amplitude adjusting means is a Mach-Zehnder interferometer provided with thermooptic phase shifters.

11. An optical filter according to claim 6, wherein said optical waveguide is based on silica, and said optical amplitude adjusting means is a thermooptic phase shifter.

* * * * *

UNITED STATES PATENT AND TRADEMARK OFFICE
CERTIFICATE OF CORRECTION

PATENT NO. : 6,724,957 B2  
APPLICATION NO. : 10/213075  
DATED : April 20, 2004  
INVENTOR(S) : Takashi Saida et al.

Page 1 of 1

It is certified that error appears in the above-identified patent and that said Letters Patent is hereby corrected as shown below:

Title Page

Item (*) Notice

"Subject to any disclaimer, the term of this patent is extended or adjusted under 35 U.S.C. 154(b) by 21 days." Should read --Subject to any disclaimer, the term of this patent is extended or adjusted under 35 U.S.C. 154(b) by 85 days.--

Signed and Sealed this

Fifth Day of February, 2008

JON W. DUDAS  
*Director of the United States Patent and Trademark Office*